United States Patent
Toyonori et al.

(10) Patent No.: US 7,518,742 B2
(45) Date of Patent: Apr. 14, 2009

(54) IMAGE PROCESSING APPARATUS WITH GROUND-TINT PATTERN RECOGNITION AND ABNORMALITY DETECTION

(75) Inventors: Shiho Toyonori, Tokyo (JP); Tsuyoshi Endoh, Kanagawa (JP); Takeshi Kowada, Saitama (JP); Nobuaki Tomidokoro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 599 days.

(21) Appl. No.: 11/280,256

(22) Filed: Nov. 17, 2005

(65) Prior Publication Data

US 2006/0126097 A1    Jun. 15, 2006

(30) Foreign Application Priority Data

Nov. 26, 2004    (JP)    ............... 2004-341473

(51) Int. Cl.
  *H04N 1/40* (2006.01)
  *H04N 1/44* (2006.01)
  *G06K 9/78* (2006.01)
  *G06K 15/02* (2006.01)

(52) U.S. Cl. .................... 358/1.14; 382/135

(58) Field of Classification Search ............ 358/1.9, 358/2.1, 3.24, 3.28, 1.14, 1.6, 501, 530, 401, 358/448, 468, 437; 382/100, 135, 137, 181, 382/217, 218; 399/366; 340/5.86; 356/71; 283/901, 902
See application file for complete search history.

(56) References Cited

U.S. PATENT DOCUMENTS

| | | | | |
|---|---|---|---|---|
| 5,418,602 A | * | 5/1995 | Nishikawa | ............. 399/366 |
| 5,440,409 A | * | 8/1995 | Sugano et al. | ............. 358/501 |
| 5,444,518 A | * | 8/1995 | Hashiguchi et al. | ......... 358/501 |
| 5,640,467 A | * | 6/1997 | Yamashita et al. | ............. 382/181 |
| 5,722,029 A | | 2/1998 | Tomidokoro et al. | |
| 5,781,653 A | * | 7/1998 | Okubo | ............. 382/135 |
| 5,987,227 A | | 11/1999 | Endo et al. | |
| 6,226,102 B1 | | 5/2001 | Koike et al. | |
| 6,597,470 B1 | | 7/2003 | Tomidokoro | |
| 6,832,010 B2 | | 12/2004 | Miyazaki et al. | |
| 6,833,928 B2 | | 12/2004 | Tomidokoro | |
| 7,131,775 B2 | * | 11/2006 | Uchida et al. | ............. 400/62 |
| 7,168,868 B2 | * | 1/2007 | Uchida et al. | ............. 358/3.28 |
| 2004/0252347 A1 | * | 12/2004 | Hosoya et al. | ............. 358/3.28 |
| 2005/0088701 A1 | * | 4/2005 | Uchida et al. | ............. 358/3.28 |

(Continued)

FOREIGN PATENT DOCUMENTS

JP    4-302374    10/1992

(Continued)

*Primary Examiner*—Scott A Rogers
(74) *Attorney, Agent, or Firm*—Oblon, Spivak, McClelland, Maier & Neustadt, P.C.

(57) ABSTRACT

An image processing apparatus includes a controlling unit that controls all units of the image forming apparatus, a reading unit that reads an image, a processing unit that generates image data based on the image read, a recognizing unit that recognizes a ground tint pattern in the image read, and a detecting unit that detects an abnormality in the recognizing unit. When the recognizing unit recognizes a ground tint pattern in an image read, the controlling unit controls the processing unit to perform a special processing on the image. When the detecting unit detects an abnormality in the recognizing unit, the controlling unit controls the image forming apparatus according to the abnormality.

9 Claims, 7 Drawing Sheets

U.S. PATENT DOCUMENTS

| | | | |
|---|---|---|---|
| 2005/0141907 A1 | 6/2005 | Izumikawa et al. | |
| 2005/0174596 A1* | 8/2005 | Uchida et al. | 358/1.14 |
| 2006/0126097 A1* | 6/2006 | Toyonori et al. | 358/1.14 |
| 2006/0147236 A1* | 7/2006 | Uchida et al. | 400/62 |
| 2006/0197980 A1* | 9/2006 | Kanbara | 358/1.15 |
| 2006/0228045 A1* | 10/2006 | Sakai | 382/294 |
| 2007/0003341 A1* | 1/2007 | Guan et al. | 399/366 |
| 2007/0041032 A1* | 2/2007 | Sugimoto et al. | 358/1.14 |
| 2007/0133036 A1* | 6/2007 | Matsunoshita et al. | 358/1.14 |
| 2007/0171480 A1* | 7/2007 | Matsunoshita | 358/3.28 |
| 2007/0247652 A1* | 10/2007 | Akahori | 358/1.13 |

FOREIGN PATENT DOCUMENTS

| | | |
|---|---|---|
| JP | 6-62231 | 3/1994 |
| JP | 6-125459 | 5/1994 |
| JP | 2000-232574 | 8/2000 |
| JP | 2004-58404 | 2/2004 |
| JP | 2004-200897 | 7/2004 |

* cited by examiner

IMAGE PROCESSING APPARATUS WITH GROUND-TINT PATTERN RECOGNITION AND ABNORMALITY DETECTION

CROSS-REFERENCE TO RELATED APPLICATIONS

The present document incorporates by reference the entire contents of Japanese priority document, 2004-341473 filed in Japan on Nov. 26, 2004.

BACKGROUND OF THE INVENTION

1. Field of the Invention

The present invention relates to an image processing apparatus capable of carrying out a special processing on a document with a ground tint pattern.

2. Description of the Related Art

Due to improvements in image processing and image formation techniques, copying machines can produce elaborate copies of banknote that can hardly be distinguished from a real banknote. One approach is to provide an image processing apparatus with a function of determining whether an image read by a scanner is a special document, such as a banknote or a valuable security, and prohibiting illegal reproduction or transfer of such image data.

Japanese Patent Application Laid-open No. 2004-200897 discloses an image processing apparatus provided with a function of recognizing a special document. This image processing apparatus includes a ground-tint-pattern recognizing unit that recognizes a special document by comparing a ground tint pattern extracted from an image read from a document with a reference ground tint pattern. When the ground-tint-pattern recognizing unit recognizes that the document is a special document, the image processing apparatus prohibits the image from being printed, or performs a processing on the image by whitening the image, for example, or prohibits the image from being transferred outside, thereby preventing leakage of the image of the special document. Moreover, a user can freely change the reference ground tint pattern or change a determination standard.

However, the conventional technology is not capable of detecting an abnormality in the ground-tint-pattern recognizing unit. Therefore, when an abnormality occurs, a ground tint pattern cannot be checked. As a result, the image processing apparatus cannot be prevented from reading an image from a special document, and producing illegal reproductions of the image.

SUMMARY OF THE INVENTION

It is an object of the present invention to at least solve the problems in the conventional technology.

According to an aspect of the present invention, an image processing apparatus includes a controlling unit that controls all units of the image forming apparatus, a reading unit that reads an image, a processing unit that generates image data based on the image read by the reading unit, a recognizing unit that recognizes a ground tint pattern in the image read by the reading unit, and a detecting unit that detects an abnormality in the recognizing unit, wherein when the recognizing unit recognizes a ground tint pattern in an image read by the reading unit, the controlling unit controls the processing unit to perform a special processing on the image, and when the detecting unit detects an abnormality in the recognizing unit, the controlling unit controls the image forming apparatus according to the abnormality.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described below with reference to accompanying drawings. The present invention is not limited to these embodiments.

An image processing apparatus such as a digital multifunction product according to embodiments of the present invention are explained below. The image processing apparatus carries out image output processes including printing of an image, and transferring of an image to outside based on image data read from a document.

The image processing apparatus has a function of controlling the apparatus such that an image of a special document such as a banknote and a valuable security is not output. To achieve this function, it is necessary to determine whether a document is a special document. According to the embodiments, this determination is made by a ground-tint-pattern recognizing unit that recognizes a ground tint pattern of the document image.

Further, the image processing apparatus includes an abnormality detector that detects an abnormality that occurs in the ground-tint-pattern recognizing unit, and a controller that prevents an image of a special document from being output when the abnormality detector detects an abnormality.

The image processing apparatus can be independently provided, or connected to a network. When the image processing apparatus is connected to a network, the apparatus exchanges a read input document image with an external apparatus, and outputs the image.

Figure 1:
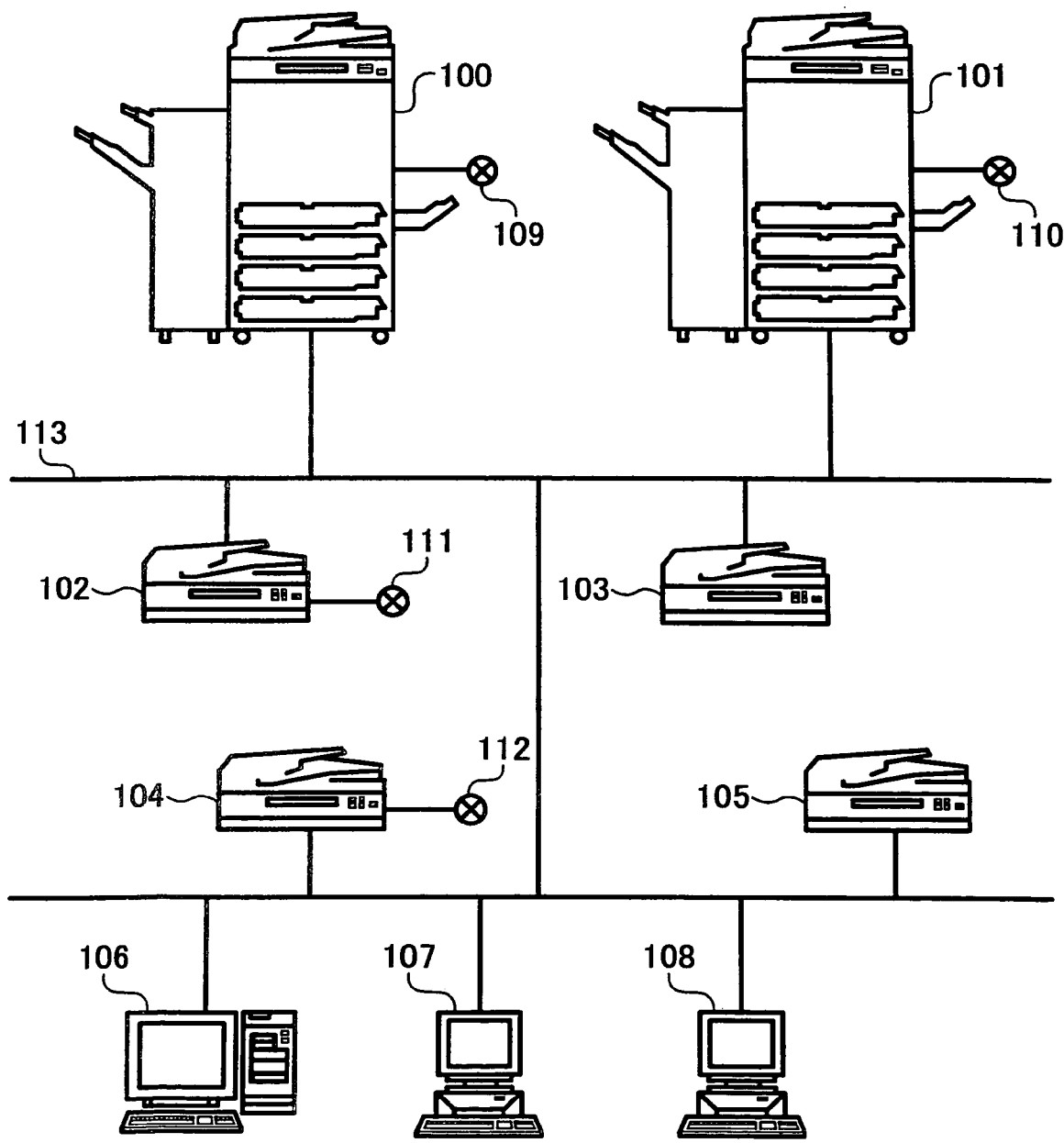
FIG. 1 depicts an image processing system that includes an image processing apparatus according to embodiments of the present invention.

FIG. 1 depicts an image processing system that includes an image processing apparatus according to the embodiments of the present invention.

The image processing system includes digital multifunction products (a copying machine having multiple functions of a copying machine, a facsimile apparatus, a scanner, or the like.) 100 and 101, scanners 102 and 104, printers 103 and 105, and computers 106, 107, and 108. These are all connected to a network 113.

The digital multifunction products 100 and 101, the scanners 102 and 104, and the printers 103 and 105 constitute the image processing apparatus according to the embodiments.

The digital multifunction products 100 and 101 read document images, store read document images, receive images from external apparatuses such as the scanners 102 and 104 via the network 113, and print out images or transfer images to the outside (a scanner distribution or the like) based on these images. The scanners 102 and 104 store read document images, and transfer the read document images to the external apparatuses such as the digital multifunction products 100 and 101 and the printers 103 and 105 via the network 113. The printers 103 and 105 store document images that are transferred from the external apparatuses such as the scanners 102 and 104 and the digital multifunction products 100 and 101 via the network 113, and print out images based on the images received from the external apparatuses.

The digital multifunction products 100 and 101 and the scanners 102 and 104 can directly transmit the read images as facsimile data to public line networks 109, 110, 111, and 112, as telephone lines.

The computers 106, 107, and 108 can operate the digital multifunction products 100 and 101, the scanners 102 and 104, and the printers 103 and 105 that are connected to the network 113, and can transmit, receive, and store document images. Therefore, these units can cooperatively constitute the image processing apparatus according to the present invention.

The image processing apparatus according to the invention is explained based on the embodiments below. When the invention is applied to the scanner, the printer, and the facsimile apparatus, the digital multifunction product includes all necessary functions. Therefore, a digital multifunction product is taken as an example to explain the embodiments.

Figure 2:
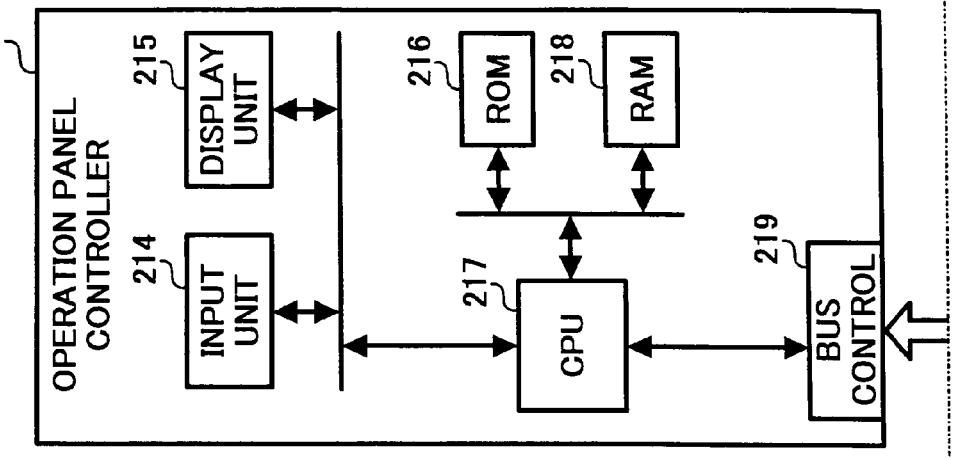
FIG. 2 is a schematic of a control system of a digital multifunction product according to the embodiment.
Figure 2:
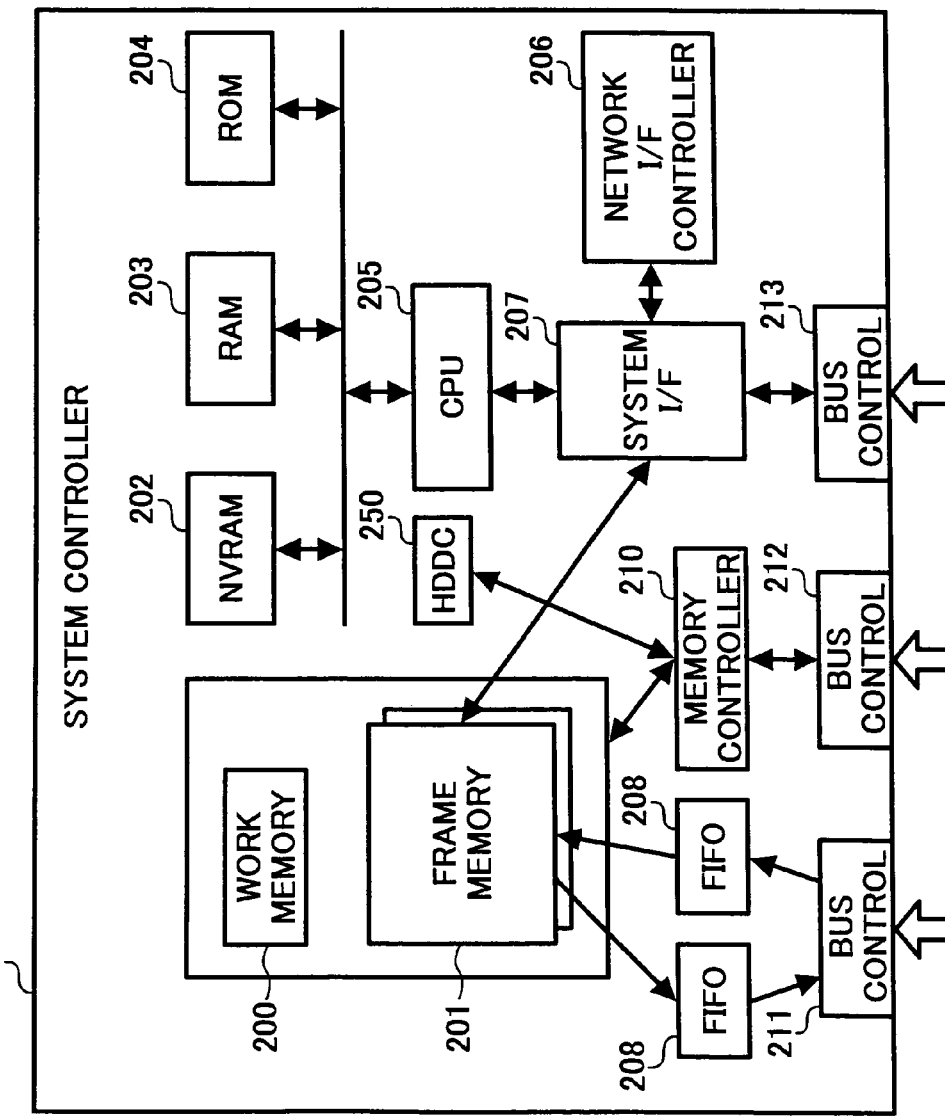
Figure 2B:
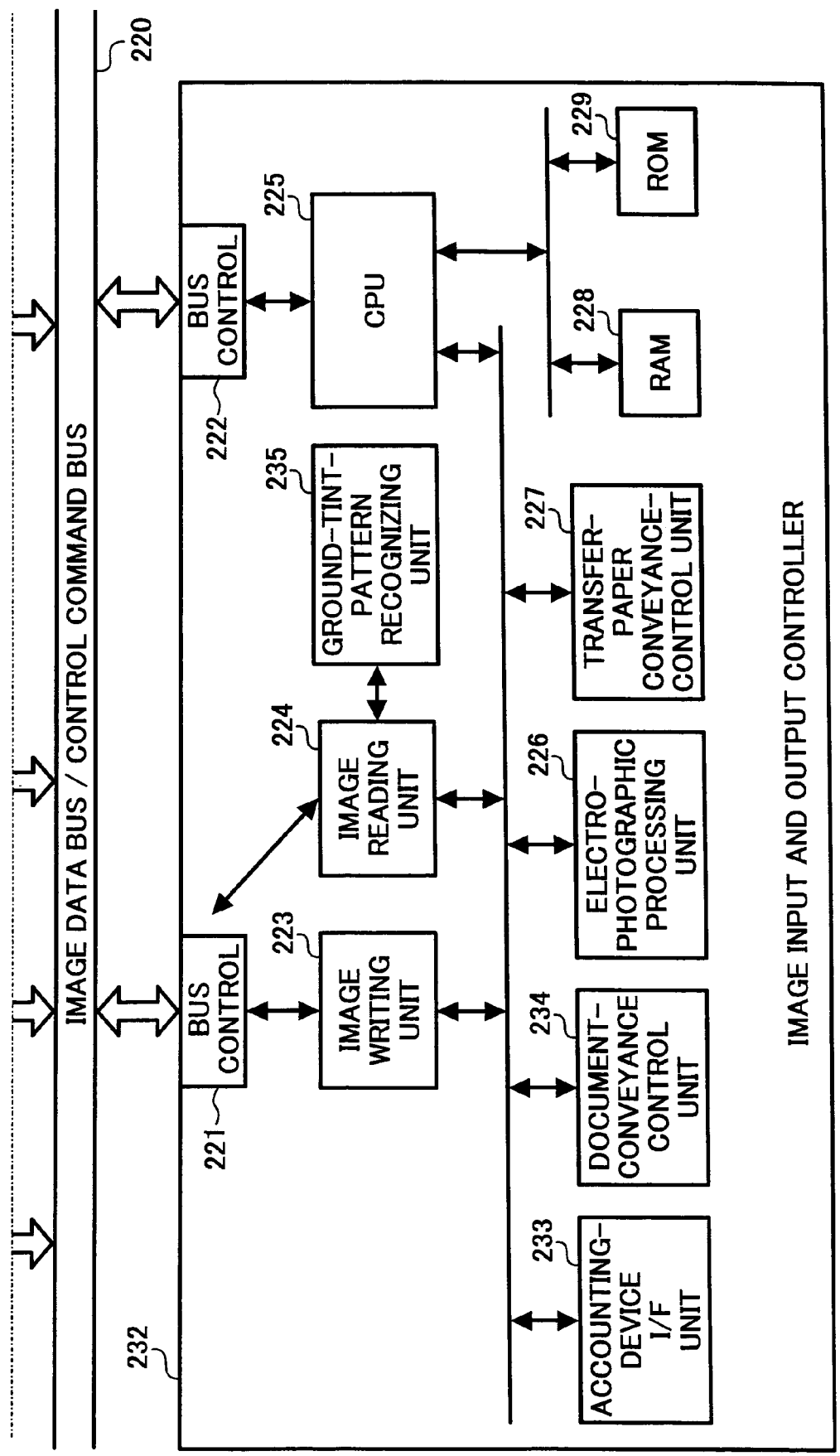

FIG. 2 is a schematic of a control system of the digital multifunction product according to the embodiments.

The control system of the digital multifunction product 100 includes a system controller 230, an operation panel controller 231, and an image input and output controller 232.

The system controller 230 can have one or plural functions of scanner application, copy application, facsimile application, and printer application, thereby controlling the total system. The operation panel controller 231 enables a user to input the setting of an operation condition to the control system following the guidance of the display unit. The image input and output controller 232 controls the reading of a document image, and writing of an image onto transfer paper according to an electrophotographic technique.

An image data bus/control command bus 220 is used to transfer image data and a control command through the bus in timesharing. The image data bus/control command bus 220 is connected to the controllers through bus controls 211, 212, 213, 219, 221, and 222.

A central processing unit (CPU) 205 controls the system controller 230. A control program of the system controller 230 is stored in a read-only memory (ROM) 204. A random access memory (RAM) 203 is used to store work data used by the CPU 205. A nonvolatile random access memory (NVRAM) 202 is used to store manage information of the total system. A network interface (I/F) controller 206 controls a connection to the network.

A system I/F 207 controls transfer of facsimile data and printout data to be processed within the system based on an instruction from the CPU 205. A work memory 200 is used to develop an image to be used for a print output. A frame memory 201 is a work memory for storing image data of a read document image and a written image. The image data is a coded image or a dot image.

A first-in and first-out (FIFO) buffer 209 converts transfer speed of data when an input image is written into the frame memory 201. Similarly, a FIFO buffer 208 converts a data transfer speed when image data stored in the frame memory 201 is transferred as an output image.

A memory controller 210 controls the input and output of an image between the frame memory 201, a hard disk drive controller (HDDC) 250, and the bus 220, without the control from the CPU 205.

The HDDC 250 has a known hard disk drive (HDD) inside the drive control, and controls the input and out of image data to the HDD. An image read with an image reading unit 224 and an image obtained via the network are stored in the HDD.

A CPU 217 controls the operation panel controller 231. A control program of the operation panel controller 231 is written in a ROM 216. A RAM 218 is a work memory used by the CPU 217. An input unit 214 is used by the user to input a system setting. A display unit 215 displays guidance for the user to confirm content and state of a system setting and input operation.

A CPU 225 controls the image input and output controller 232. A control program of the image input and output controller 232 is written in a ROM 229. A RAM 228 is a work memory used by the CPU 225.

An image writing unit 223 irradiates a laser beam in a pixel frequency, and optically writes a latent image onto an image carrier surface of a photoconductor with a polygon scanner according to a scanning system.

The image reading unit 224 is an optical scanner control unit that reads a document image by photoelectrically converting, with a charge-coupled device (CCD), light reflected from the document surface irradiated with lamp light. The image reading unit 224 isolates visible and invisible identifiers from image data by carrying out image processing. The CPU 225 encodes the isolated identifiers, and transmits the identifiers to the system controller 230. The identifiers are used as information for specifying an image processing apparatus and a computer that are present on the network.

A document-conveyance control unit 234 conveys each one of plural laminated sheets of document for the image reading unit 224 to read an image from each sheet. The document-conveyance control unit 234 also detects a size of the document.

An electrophotographic processing unit 226 develops with a toner an image written as a latent image with a laser beam on the photoconductor, and transfers the developed image onto a sheet of paper, and fixes the image according to an electrophotographic process.

A transfer-paper-conveyance control unit 227 controls transfer paper onto which an image is transferred with the electrophotographic processing unit 226.

An accounting-device I/F unit 233 converts an instruction of the CPU 225 into an I/F exclusive for an accounting device (not shown), to connect the image input and output controller 232 to the accounting device. The accounting-device I/F unit 233 exchanges signals of a printing condition, accounting, and print permission with the accounting device.

A ground-tint-pattern recognizing unit 235 recognizes a ground tint pattern of a document image read by the image reading unit 224. The ground-tint-pattern recognizing unit 235 recognizes a ground tint pattern to determine a special document such as a banknote and a valuable security. A determination made about the special document is transmitted to the image reading unit 224. Upon reception of information that the ground-tint-pattern recognizing unit 235 recognizes a ground tint pattern, the image reading unit 224 fixes the image data to a predetermined gradation in a predetermined phase based on the instruction from the CPU 225, and processes the image of the special document so that the image cannot be read. Recognition of a ground tint pattern and control of an image output based on a result of the recognition are explained below.

Figure 3:
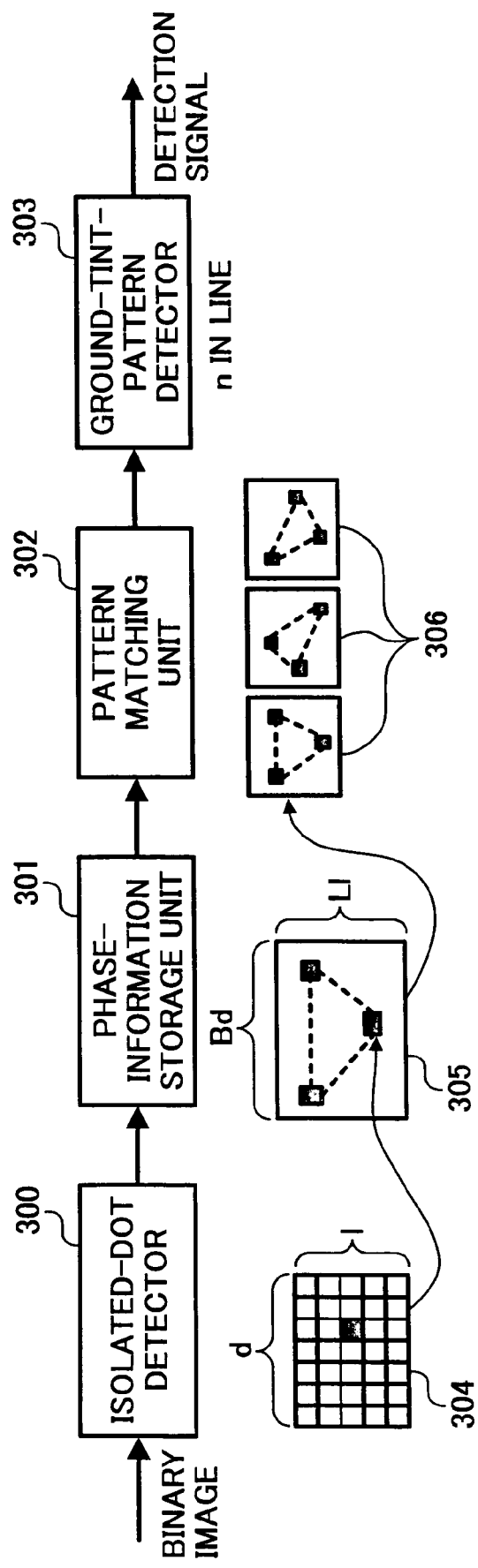
FIG. 3 is a schematic of a processing block that recognizes a ground tint pattern provided in a ground-tint-pattern recognizing unit shown in FIG. 2.

FIG. 3 is a schematic of a processing block that recognizes a ground tint pattern provided in the ground-tint-pattern recognizing unit 235.

A document image read by the image reading unit 224 and converted into binary data is transmitted to the ground-tint-pattern recognizing unit 235. The received binary image data is input to an isolated-dot detector 300. The isolated-dot detector 300 detects information 304 of an isolated pixel in a "main scan d pixel×sub-scan 1 line" area. The detected information 304 of the isolated pixel is transmitted to a phase-information storage unit 301 together with the image data.

The phase-information storage unit 301 stores information 305 expressing a positional relation of the isolated pixel in a "Bd×L1" block including an area formed by Bd of "main scan d pixel×B" and L1 of "sub-scan 1 line×L, from the information 304 of the isolated pixel in the "main scan d pixel×sub-scan 1 line" area.

A pattern matching unit 302 matches position relational information 305 of the isolated pixel in the "Bd×L1" block stored by the phase-information storage unit 301 with a predetermined ground tint pattern (a ground tint pattern of the special document such as a banknote and a valuable security), thereby obtaining coincidence 306 of the patterns, and transmits the obtained result to a ground-tint-pattern detector 303.

The ground-tint-pattern detector 303 determines whether the position relational information 305 is the ground tint pattern, based on a result of detecting a pattern matching in a predetermined number n blocks in the sub-scanning line, and outputs a result of the determination as a detection signal.

Upon recognizing a ground tint pattern, the ground-tint-pattern recognizing unit 235 performs a special processing on the image of the special document having the ground tint pattern to prevent the image from being output. For example, at the time of printing out a copy of a document image, the ground-tint-pattern recognizing unit 235 processes the image of the special document to make it impossible to read the image.

Figure 4:
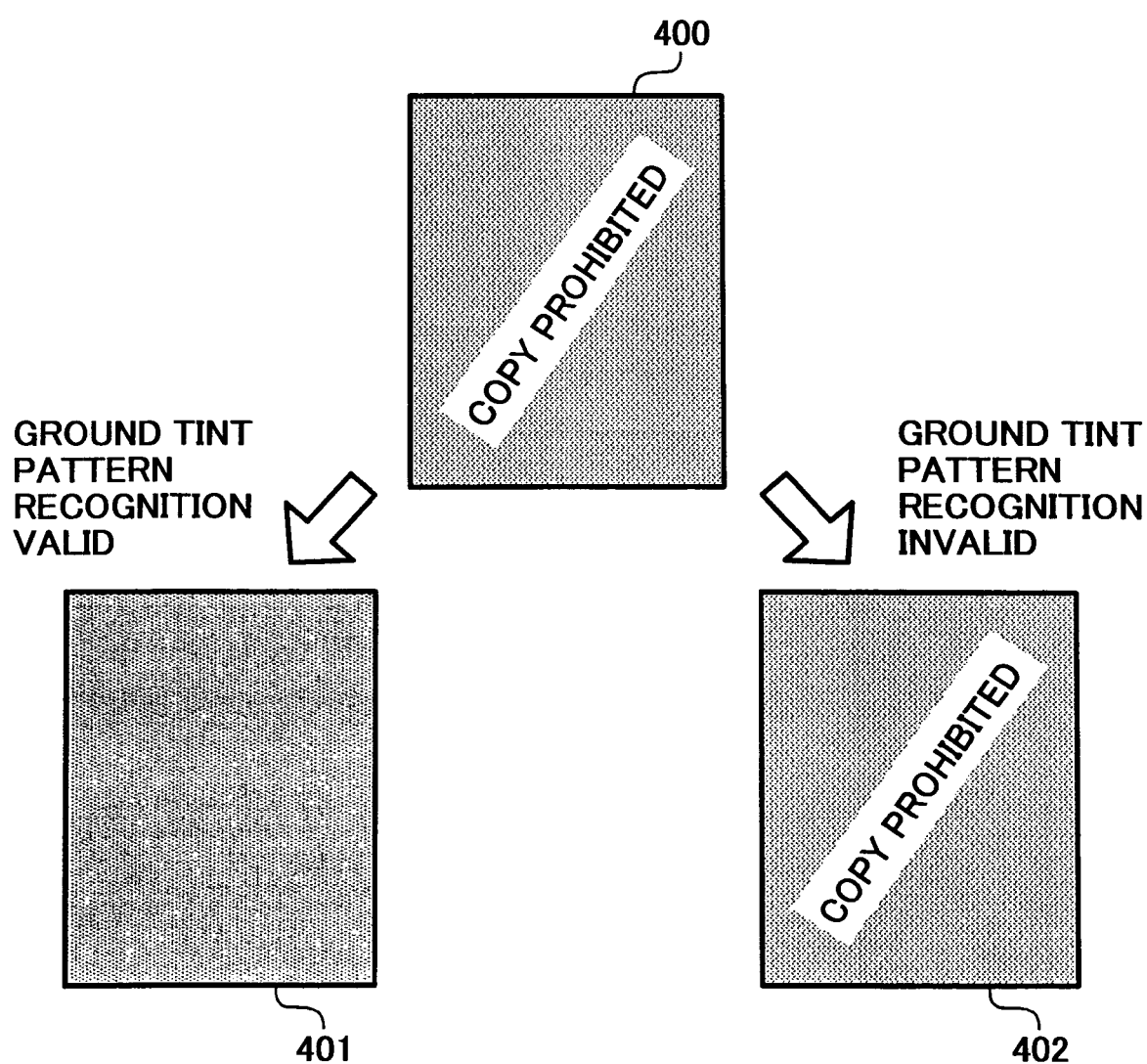
FIG. 4 depicts a control carried out to prevent an image of a special document having a ground tint pattern from being output normally.
Figure 5:
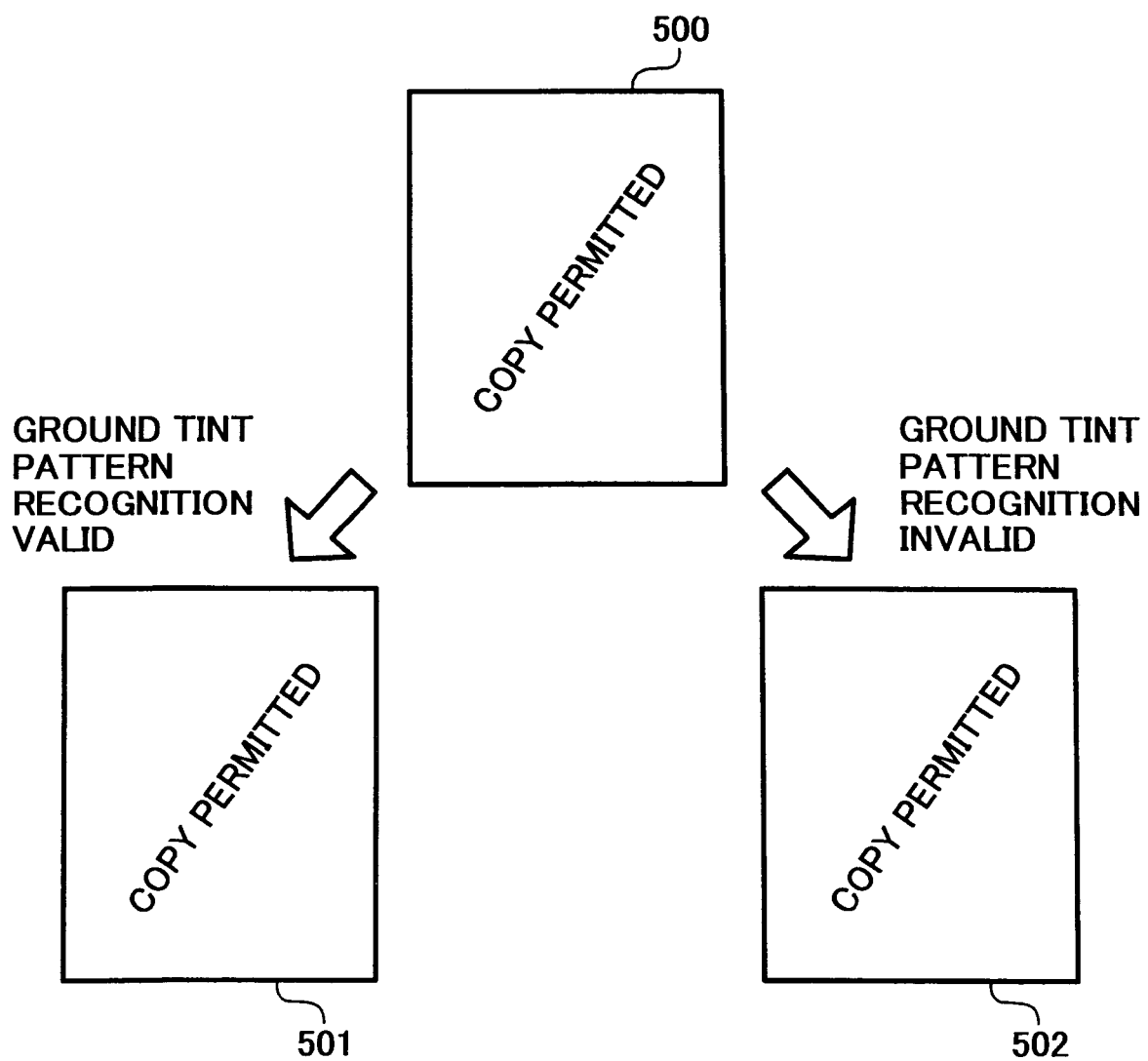
FIG. 5 depicts a control carried out to output a document without a ground tint pattern.

FIGS. 4 and 5 are explanatory diagrams of controls carried out to prevent an image of a special document from being output. In FIG. 4, a document having a ground tint pattern is output. In FIG. 5, a document having no ground tint pattern is output.

As shown in FIG. 4, the ground-tint-pattern recognizing unit 235 recognizes a ground tint pattern at the time of reading a document 400 printed with a ground tint pattern. Upon recognizing the ground tint pattern, the ground-tint-pattern recognizing unit 235 processes the image data to fix the data to a predetermined gradation and a predetermined phase, and obtains a print output 401 to make it impossible to read the document image, using the processed data. When the ground-tint-pattern recognizing unit 235 does not perform the operation of recognizing the ground tint pattern at the time of reading the same document 400 printed with the ground tint pattern, the document image is directly read as it is, and a print output 402 is normally printed out. As a result, an illegal reproduction of a special document is output.

The ground-tint-pattern recognizing unit 235 performs the operation of recognizing a ground tint pattern at the time of reading a document 500 without a ground tint pattern, as shown in FIG. 5. Because no ground tint pattern is recognized, the ground-tint-pattern recognizing unit 235 does not process the image data to fix the data to a predetermined gradation or a predetermined phase, and obtains a print output 501 of a normal image, using this data. When the ground-tint-pattern recognizing unit 235 does not perform the operation of recognizing a ground tint pattern at the time of reading the same document 500 without the ground tint pattern, the document image is directly read as it is. As a result, a normal print output 502 that is the same as that obtained when a ground tint pattern is recognized (the print output 501) is obtained.

Control to be carried out when an abnormality occurs in the ground-tint-pattern recognizing unit 235 that is provided to control the output image of the special document is explained next.

When an abnormality occurs in the ground-tint-pattern recognizing unit 235, it is not possible to prevent the image of the special document from being output because the ground tint pattern cannot be checked, as described with reference to the print output 402 in FIG. 4. This problem can be solved by controlling the abnormality of the ground-tint-pattern recognizing unit 235. Therefore, when the abnormality of the ground-tint-pattern recognizing unit 235 is recognized, the output operation of the read image of the document is stopped or suspended, thereby preventing the image of the special document from being output.

Figure 6:
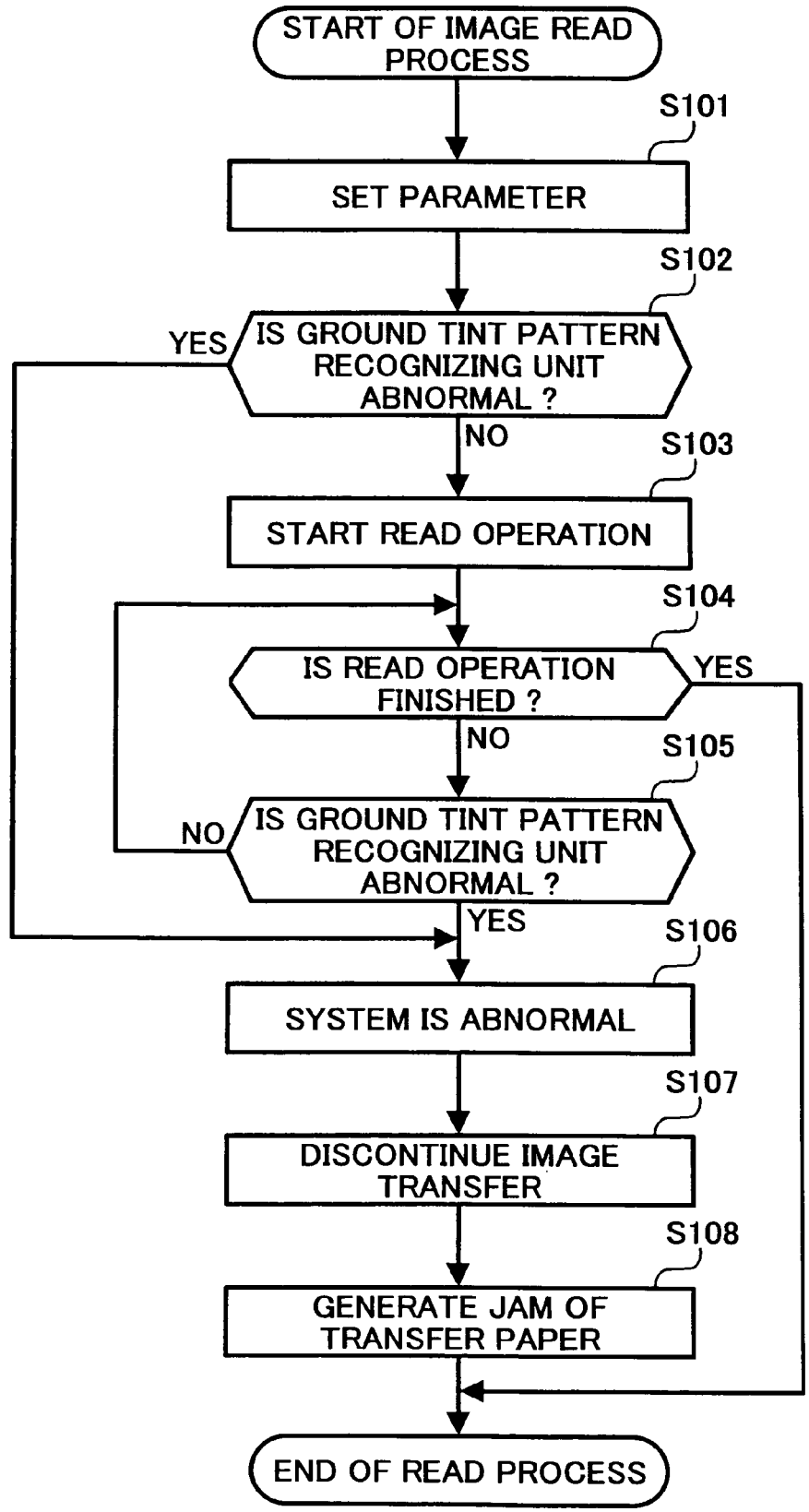
FIG. 6 is a flowchart of a document read process to control an abnormality in a ground-tint-pattern recognizing unit when the abnormality is detected.

FIG. 6 is a flowchart of a document read process to control an abnormality in the ground-tint-pattern recognizing unit 235 when the abnormality is detected.

The control of the document read process carried out when an abnormality is detected in the ground-tint-pattern recognizing unit 235 according to a first embodiment to a fifth embodiment is explained next. Each embodiment represents a variation that can be applied to the above digital multifunction product. The flowchart shown in FIG. 6 is commonly referred to in each embodiment. Therefore, some steps are redundant in some embodiments.

In the first embodiment, the image processing apparatus detects an abnormality in the ground-tint-pattern recognizing unit 235, and controls the abnormality.

On the operation panel, a start button is depressed after setting an operation mode of a copy, a facsimile, or a scanner function that is necessary to read the document with the scanner. The CPU 225 sets a parameter that is necessary for the register of the ground-tint-pattern recognizing unit 235 (step S101).

After the parameter is set, the CPU 225 sets a status flag of the ground-tint-pattern recognizing unit 235. When the status flag is set, the status flag indicates that the setting of the parameter of the ground-tint-pattern recognizing unit 235 is completed normally. The setting of the status flag is notified to the image reading unit 224.

The image reading unit 224 detects an abnormality in the ground-tint-pattern recognizing unit 235 (step S102). In this embodiment, two units are used to detect the abnormality in the ground-tint-pattern recognizing unit 235 at the read starting time. The two units simultaneously carry out the detect operation. When one of the two units detects an abnormality, it is determined that the abnormality occurs, thereby preventing a failure of detection. While the two abnormality detectors are used in this embodiment, it is also possible to use only one of the two detectors.

A first abnormality detector checks the setting of the status flag. When the ground-tint-pattern recognizing unit 235 does not notify a normal completion of the setting (the setting of the status flag) within a predetermined time since the setting of the parameter is started, the image reading unit 224 recognizes that an abnormally has occurred in the ground-tint-pattern recognizing unit 235.

A second abnormality detector confirms a signal level of a connection port with the ground-tint-pattern recognizing unit 235 at a constant cycle. When the ground-tint-pattern recognizing unit 235 is operating normally, the signal level at the connection port is always at an H (High) level. Therefore, when the signal is at an L (Low) level, it can be recognized that the ground-tint-pattern recognizing unit 235 is not connected or an abnormality has occurred in the ground-tint-pattern recognizing unit 235. Because the second abnormality detector is based on the method of detecting a signal level at the connection port of the ground-tint-pattern recognizing unit 235 as described above, it is possible to check the presence of an abnormality in the ground-tint-pattern recognizing unit 235 even when the ground tint pattern recognizing operation is carried out during the image read operation. This second abnormality detector can be also used in the second embodiment described later.

When an abnormality is not detected in the ground-tint-pattern recognizing unit 235 at the abnormality detecting step (step S102), the scanner is operated to start the reading of the document (step S103). Thereafter, the end of the document read operation is confirmed (step S104; Yes), and the control flow of the document read process ends.

On the other hand, when the image reading unit 224 detects an abnormality (step S102; Yes), a system abnormality process is carried out (step S106). The image input and output controller 232 notifies the system controller 230 about the abnormality in the ground-tint-pattern recognizing unit 235, to carry out the system abnormality process. Upon receiving the notification of abnormality, the system controller 230 requests the image input and output controller 232 to shift to the system abnormality state. The image input and output controller 232 then shifts to the system abnormality state. When the image input and output controller 232 shifts to the system abnormality state, the operation of each unit under the control of the image input and output controller 232 is stopped. Therefore, the operation of the image reading unit 224 is not started either.

The system controller 230 also requests the operation panel controller 231 to shift to the system abnormality state. At this request, the operation panel controller 231 performs a control not to accept the user's input operation to use the function necessary to control the image input and output controller 232 including the reading of the document image, and displays a message to this effect for the user.

After ending the system abnormality process (step S106), the control flow of the document read process is finished in the flow according to this embodiment.

While an abnormality is controlled by shifting to the system abnormality state in the first embodiment, it is also possible to control the abnormality by controlling only the reading of a document image, as explained in the second embodiment.

In the second embodiment, the operation of detecting an abnormality in the ground-tint-pattern recognizing unit 235 at the read starting time is the same as that in the first embodiment. The second embodiment is different from the first embodiment in that the reading of the document image is controlled when an abnormality is detected. Specifically, in the control flow shown in FIG. 6, in place of the system abnormality process step (step S106) in the first embodiment, a process of document read stop is executed in this embodiment.

As the process of document read stop, when the image reading unit 224 detects an abnormality in the ground-tint-pattern recognizing unit 235, the image input and output controller 232 notifies the system controller 230 about the abnormality in the ground-tint-pattern recognizing unit 235. Upon receiving the notice of abnormality, the system controller 230 requests the image input and output controller 232 to stop reading the document. Upon receiving this request, the CPU 225 of the image input and output controller 232 instructs the image reading unit 224 to stop reading the document. Based on this instruction, the image reading unit 224 stops the operation. Consequently, the image read operation is not started.

When the image reading unit 224 is stopped from starting to read the document, the system controller 230 displays a message to this effect for the user, through the operation panel controller 231.

After stopping the document read process, the control flow of the document read process ends in this embodiment.

In the third embodiment, an abnormality in the ground-tint-pattern recognizing unit 235 is detected during a read operation, thereby controlling the abnormality.

At the starting of the document reading, an abnormality in the ground-tint-pattern recognizing unit 235 is detected (step S102), and the abnormality is controlled (step S106). This process is carried out in a similar manner to that of the first and the second embodiments.

When an abnormality is not detected at the starting time of the document reading (step S102; No), the scanner is operated to start reading the document (step S103).

Thereafter, until when the document read operation ends (step S104; Yes), detection of an abnormality in the ground-tint-pattern recognizing unit 235 is carried out repeatedly at a constant cycle (step S105). In this case, the second abnormality detector explained in the first and the second embodiments is used to detect an abnormality in the ground-tint-pattern recognizing unit 235. In other words, the second abnormality detector detects whether the signal level at the connection port of the ground-tint-pattern recognizing unit 235 is at the L (Low) level.

After repeatedly carrying out detection operation of an abnormality in the ground-tint-pattern recognizing unit 235 at a constant cycle, when the document read operation ends (step S104; Yes) without detecting an abnormality (step S105; No), the control flow of the document read process ends.

On the other hand, when the image reading unit 224 detects an abnormality during the read operation (step S105; Yes), a system abnormality process is carried out (step S106). As the system abnormality process, the image input and output controller 232 notifies the system controller 230 about the abnormality in the ground-tint-pattern recognizing unit 235. Upon receiving the notification of abnormality, the system controller 230 requests the image input and output controller 232 to shift to the system abnormality state. The image input and output controller 232 then shifts to the system abnormality state.

When the image input and output controller 232 shifts to the system abnormality state, the operation of each unit under the control of the image input and output controller 232 is stopped. Therefore, the read operation of the image reading unit 224 is discontinued. When the read image is being stored into an HDD, or when the print output operation is being carried out, the transfer of the read image or the print output operation is discontinued.

When the image input and output controller 232 shifts to the system abnormality state, the system controller 230 displays a message to this effect for the user, through the operation panel controller 231.

After carrying out the system abnormality process (step S106), the control flow of the document read process ends in this embodiment.

In the third embodiment, the abnormality that occurs in the ground-tint-pattern recognizing unit 235 during the read operation is controlled by shifting to the system abnormality state. It is also possible to specifically control the reading of the document image and the transfer of the read image when an abnormality is detected.

In the fourth embodiment, the operation of detecting an abnormality in the ground-tint-pattern recognizing unit 235 during the read operation is the same as that of the third embodiment. The fourth embodiment is different from the third embodiment in that the reading of the document image is controlled and the transfer of the read image is also controlled when an abnormality is detected. Specifically, in the control flow shown in FIG. 6, in place of the system abnormality process step (step S106) in the first embodiment, a process step of stopping the document read operation and a step of discontinuing the transfer of the read image are carried out in this embodiment.

As the abnormality control operation, when the image reading unit 224 detects an abnormality in the ground-tint-pattern recognizing unit 235 (step S105; Yes), the image input and output controller 232 notifies the system controller 230 about the abnormality in the ground-tint-pattern recognizing unit 235. Upon receiving the notice of abnormality, the system controller 230 requests the image input and output controller 232 to discontinue the reading of the document and discontinue the transfer of the read document to an HDD within the HDDC 250. Upon receiving this request, the CPU 225 of the image input and output controller 232 instructs the image reading unit 224 to discontinue the reading of the document and discontinue the transfer of the read document to the HDD. Based on this instruction, the image reading unit 224 discontinues the document read operation (step S106) and discontinues the transfer of the read image to the HDD (step S107).

When the image reading unit 224 discontinues the reading of the document and discontinues the transfer of the read document to the HDD, the system controller 230 displays a message to this effect for the user, through the operation panel controller 231.

After discontinuing the reading of the document and discontinuing the transfer of the read document to the HDD, the control flow of the document read process ends in this embodiment.

In the fourth embodiment, when an abnormality occurs in the ground-tint-pattern recognizing unit 235 during the read operation, the document image read operation and the image transfer operation are discontinued. In the fifth embodiment, the print output operation is also discontinued.

In the fifth embodiment, the operation of detecting an abnormality in the ground-tint-pattern recognizing unit 235 during the read operation is the same as that of the fourth embodiment. The fifth embodiment is different from the fourth embodiment in that the print output operation is also controlled when an abnormality is detected. Specifically, in the control flow shown in FIG. 6, in place of the system abnormality process step (step S106) in the first embodiment, a process step of stopping the document read operation, a step of discontinuing the transfer of the read image, and a step of discontinuing the print output operation are carried out in this embodiment.

As the abnormality control operation, when the image reading unit 224 detects an abnormality in the ground-tint-pattern recognizing unit 235 (step S105; Yes), the image input and output controller 232 notifies the system controller 230 about the abnormality in the ground-tint-pattern recognizing unit 235. Upon receiving the notice of abnormality, the system controller 230 requests the image input and output controller 232 to discontinue the reading of the document, discontinue the transfer of the read document to an HDD within the HDDC 250, and generate a jam of a predetermined sheet of transfer paper. Upon receiving this request, the CPU 225 of the image input and output controller 232 instructs the image reading unit 224 to discontinue the reading of the document, discontinue the transfer of the read document to the HDD, and generate a jam in the transfer-paper-conveyance control unit 227. Based on this instruction, the image reading unit 224 discontinues the document read operation (step S106), discontinues the transfer of the read image to the HDD (step S107), and generates a jam in the transfer-paper-conveyance control unit 227 (step S108).

When the image reading unit 224 discontinues the reading of the document and discontinues the transfer of the read document to the HDD, the system controller 230 displays a message to this effect for the user, through the operation panel controller 231.

After discontinuing the reading of the document, discontinuing the transfer of the read document to the HDD, and generating a jam by stopping the conveyance of the transfer paper, the control flow of the document read process ends in this embodiment.

In this embodiment, the abnormality control operation at steps S106 to S108 is carried out in the control flow, based on the assumption that the digital multifunction product has a storage unit such as an HDD and a printing unit to achieve the complex functions. Therefore, when the image processing apparatus does not have a storage unit such as an HDD and a printing unit like the scanner, for example, the abnormality control flow does not require the processing of discontinuing the transfer of the read image (step S107) and the processing of generating a jam of transfer paper (step S108).

According to an aspect of the present invention, an abnormality that occurs in a ground-tint-pattern recognizing unit can be detected, thereby improving performance of an image processing apparatus.

Furthermore, the abnormality can be detected at an early stage, thereby improving the processing efficiency.

Moreover, the abnormality can be controlled from the start of the read operation and during the read operation.

Furthermore, an unnecessary reading operation can be eliminated.

Moreover, an abnormality can be controlled more thoroughly.

Furthermore, when a ground tint pattern cannot be normally recognized, a secondary use of the document image such as the distribution of the image data to the outside can be prevented.

Moreover, when a ground tint pattern cannot be normally recognized, the document can be prevented from being copied, and unnecessary conveyance of transfer paper can be prevented.

Furthermore, when an abnormality is detected, a subsequent request for a job is not accepted, thereby controlling the abnormality in the total system.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

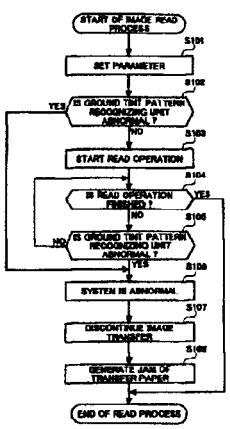

What is claimed is:

1. An image processing apparatus comprising:
   a controlling unit that controls all units of the image forming apparatus;
   a reading unit that reads an image;
   a processing unit that generates image data based on the image read by the reading unit;
   a recognizing unit that recognizes a ground tint pattern in the image read by the reading unit; and
   a detecting unit that detects an abnormality in the recognizing unit, wherein
   when the recognizing unit recognizes a ground tint pattern in an image read by the reading unit, the controlling unit controls the processing unit to perform a special processing on the image, and
   when the detecting unit detects an abnormality in the recognizing unit, the controlling unit controls the image forming apparatus according to the abnormality; and
   when the detecting means detects the abnormality while the reading means is reading the image, the controlling means stops the reading means from continuing to read the image.

2. The image processing apparatus according to claim 1, wherein the abnormality is when a setting of a parameter necessary for the recognizing means to recognize a ground tint pattern does not complete normally.

3. The image processing apparatus according to claim 1, wherein the abnormality is when the recognizing means does not generate a signal level that is normally output.

4. The image processing apparatus according to claim 1, wherein when the detecting means detects the abnormality before the reading means starts to read the image, the controlling means stops the reading means from starting to read the image.

5. The image processing apparatus according to claim 1, further comprising:
   a forming means that forms an output image based on the image data generated by the processing means, wherein
   when the detecting means detects the abnormality while the reading means is reading the image, the controlling means stops the forming means from forming the output image.

6. The image processing apparatus according to claim 1, wherein
   when the detecting means detects the abnormality before the reading means starts to read the image, the controlling means performs a system abnormality process.

7. The image processing apparatus according to claim 1, wherein
   when the detecting means detects the abnormality while the reading means is reading the image, the controlling means performs a system abnormality process.

8. The image processing apparatus according to claim 1, wherein
   when the detecting means detects the abnormality, the controlling means performs a system abnormality process.

9. The image processing apparatus according to claim 1, further comprising:
   a controlling means that controls all means of the image forming apparatus;
   a reading means that reads an image;
   a processing means that generates image data based on the image read by the reading means;
   a recognizing means that recognizes a ground tint pattern in the image read by the reading means; and
   a detecting means that detects an abnormality in the recognizing means, wherein
   when the recognizing means recognizes a ground tint pattern in an image read by the reading means, the controlling means controls the processing means to perform a special processing on the image, and
   when the detecting means detects an abnormality in the recognizing means, the controlling means controls the image forming apparatus according to the abnormality; and
   a storing unit that stores the image read by the reading unit, wherein
   when the detecting unit detects the abnormality while the reading unit is reading the image, the controlling unit stops the image from being transferred into the storing unit.

* * * * *

UNITED STATES PATENT AND TRADEMARK OFFICE
CERTIFICATE OF CORRECTION

| | | |
|---|---|---|
| PATENT NO. | : 7,518,742 B2 | |
| APPLICATION NO. | : 11/280256 | |
| DATED | : April 14, 2009 | |
| INVENTOR(S) | : Shiho Toyonori et al. | |

It is certified that error appears in the above-identified patent and that said Letters Patent is hereby corrected as shown below:

Cols. 11-12, lines 8-43;
Please delete Claims 1-9 as follows:

"1. An image processing apparatus comprising:
a controlling unit that controls all units of the image forming apparatus;
a reading unit that reads an image;
a processing unit that generates image data based on the image read by the reading unit;
a recognizing unit that recognizes a ground tint pattern in the image read by the reading unit; and
a detecting unit that detects an abnormality in the recognizing unit, wherein when the recognizing unit recognizes a ground tint pattern in an image read by the reading unit, the controlling unit controls the processing unit to perform a special processing on the image, and
when the detecting unit detects an abnormality in the recognizing unit, the controlling unit controls the image forming apparatus according to the abnormality;
and when the detecting means detects the abnormality while the reading means is reading the image, the controlling means stops the reading means from continuing to read the image.

2. The image processing apparatus according to claim 1,
wherein the abnormality is when a setting of a parameter necessary for the recognizing means to recognize a ground tint pattern does not complete normally.

3. The image processing apparatus according to claim 1,
wherein the abnormality is when the recognizing means does not generate a signal level that is normally output.

Signed and Sealed this
Eleventh Day of January, 2011

David J. Kappos
*Director of the United States Patent and Trademark Office*

4. The image processing apparatus according to claim 1, wherein when the detecting means detects the abnormality before the reading means starts to read the image, the controlling means stops the reading means from starting to read the image.

5. The image processing apparatus according to claim 1, further comprising:
a forming means that forms an output image based on the image data generated by the processing means,
wherein when the detecting means detects the abnormality while the reading means is reading the image, the controlling means stops the forming means from forming the output image.

6. The image processing apparatus according to claim 1,
wherein when the detecting means detects the abnormality before the reading means starts to read the image, the controlling means performs a system abnormality process.

7. The image processing apparatus according to claim 1,
wherein when the detecting means detects the abnormality while the reading means is reading the image, the controlling means performs a system abnormality process.

8. The image processing apparatus according to claim 1,
wherein when the detecting means detects the abnormality, the controlling means performs a system abnormality process.

9. The image processing apparatus according to claim 1, further comprising:
a controlling means that controls all means of the image forming apparatus;
a reading means that reads an image;
a processing means that generates image data based on the image read by the reading means;
a recognizing means that recognizes a ground tint pattern in the image read by the reading means; and
a detecting means that detects an abnormality in the recognizing means, wherein when the recognizing means recognizes a ground tint pattern in an image read by the reading means, the controlling means controls the processing means to perform a special processing on the image, and
when the detecting means detects an abnormality in the recognizing means, the controlling means controls the image forming apparatus according to the abnormality; and
a storing unit that stores the image read by the reading unit, wherein when the detecting unit detects the abnormality while the reading unit is reading the image, the controlling unit stops the image from being transferred into the storing unit."

Please insert the following:

-- 1. An image processing apparatus comprising:
a controlling unit that controls all units of the image forming apparatus;
a reading unit that reads an image;

a processing unit that generates image data based on the image read by the reading unit;
a forming unit that forms an output image based on the image data generated by the processing unit,
a recognizing unit that recognizes a ground tint pattern in the image read by the reading unit;
a detecting unit that detects an abnormality in the recognizing unit,
wherein when the detecting unit detects the abnormality while the reading unit is reading the image, the controlling unit stops the forming unit from forming the output image
when the recognizing unit recognizes a ground tint pattern in an image read by the reading unit, the controlling unit controls the processing unit to perform a special processing on the image, and
when the detecting unit detects an abnormality in the recognizing unit, the controlling unit controls the image forming apparatus according to the abnormality,
wherein when the detecting unit detects the abnormality while the reading unit is reading the image, the controlling unit stops the forming unit from forming the output image.

2. The image processing apparatus according to claim 1,
wherein the abnormality is when a setting of a parameter necessary for the recognizing unit to recognize a ground tint pattern does not complete normally.

3. The image processing apparatus according to claim 1,
wherein the abnormality is when the recognizing unit does not generate a signal level that is normally output.

4. The image processing apparatus according to claim 1,
wherein when the detecting unit detects the abnormality before the reading unit starts to read the image, the controlling unit stops the reading unit from starting to read the image.

5. An image processing apparatus comprising:
a controlling unit that controls all units of the image forming apparatus;
a reading unit that reads an image;
a processing unit that generates image data based on the image read by the reading unit;
a recognizing unit that recognizes a ground tint pattern in the image read by the reading unit;
a detecting unit that detects an abnormality in the recognizing unit,
when the recognizing unit recognizes a ground tint pattern in an image read by the reading unit, the controlling unit controls the processing unit to perform a special processing on the image, and
when the detecting unit detects an abnormality in the recognizing unit, the controlling unit controls the image forming apparatus according to the abnormality, and
when the detecting unit detects the abnormality while the reading unit is reading the image, the controlling unit stops the reading unit from continuing to read the image, when the detecting unit detects the abnormality before the reading unit starts to read the image, the controlling unit performs a system abnormality process.

CERTIFICATE OF CORRECTION (continued)
U.S. Pat. No. 7,518,742 B2

6. The image processing apparatus according to claim 1, wherein
when the detecting unit detects the abnormality while the reading unit is reading the image, the controlling unit performs a system abnormality process.

7. The image processing apparatus according to claim 1, wherein
when the detecting unit detects the abnormality, the controlling unit performs a system abnormality process. --

UNITED STATES PATENT AND TRADEMARK OFFICE
CERTIFICATE OF CORRECTION

PATENT NO.        : 7,518,742 B2
APPLICATION NO.   : 11/280256
DATED             : April 14, 2009
INVENTOR(S)       : Shiho Toyonori et al.

It is certified that error appears in the above-identified patent and that said Letters Patent is hereby corrected as shown below:

Delete the title page and substitute therefore the attached title page showing corrected number of claims in patent.

Cols. 11-12, lines 8-43;
Please delete Claims 1-9 as follows:

"1. An image processing apparatus comprising:
a controlling unit that controls all units of the image forming apparatus;
a reading unit that reads an image;
a processing unit that generates image data based on the image read by the reading unit;
a recognizing unit that recognizes a ground tint pattern in the image read by the reading unit; and
a detecting unit that detects an abnormality in the recognizing unit, wherein when the recognizing unit recognizes a ground tint pattern in an image read by the reading unit, the controlling unit controls the processing unit to perform a special processing on the image, and
when the detecting unit detects an abnormality in the recognizing unit, the controlling unit controls the image forming apparatus according to the abnormality;
and when the detecting means detects the abnormality while the reading means is reading the image, the controlling means stops the reading means from continuing to read the image.

2. The image processing apparatus according to claim 1,
wherein the abnormality is when a setting of a parameter necessary for the recognizing means to recognize a ground tint pattern does not complete normally.

This certificate supersedes the Certificate of Correction issued January 11, 2011.

Signed and Sealed this
Fifteenth Day of February, 2011

David J. Kappos
*Director of the United States Patent and Trademark Office*

3. The image processing apparatus according to claim 1,
wherein the abnormality is when the recognizing means does not generate a signal level that is normally output.

4. The image processing apparatus according to claim 1, wherein when the detecting means detects the abnormality before the reading means starts to read the image, the controlling means stops the reading means from starting to read the image.

5. The image processing apparatus according to claim 1, further comprising:
a forming means that forms an output image based on the image data generated by the processing means,
wherein when the detecting means detects the abnormality while the reading means is reading the image, the controlling means stops the forming means from forming the output image.

6. The image processing apparatus according to claim 1,
wherein when the detecting means detects the abnormality before the reading means starts to read the image, the controlling means performs a system abnormality process.

7. The image processing apparatus according to claim 1,
wherein when the detecting means detects the abnormality while the reading means is reading the image, the controlling means performs a system abnormality process.

8. The image processing apparatus according to claim 1,
wherein when the detecting means detects the abnormality, the controlling means performs a system abnormality process.

9. The image processing apparatus according to claim 1, further comprising:
a controlling means that controls all means of the image forming apparatus;
a reading means that reads an image;
a processing means that generates image data based on the image read by the reading means;
a recognizing means that recognizes a ground tint pattern in the image read by the reading means; and
a detecting means that detects an abnormality in the recognizing means, wherein when the recognizing means recognizes a ground tint pattern in an image read by the reading means, the controlling means controls the processing means to perform a special processing on the image, and
when the detecting means detects an abnormality in the recognizing means, the controlling means controls the image forming apparatus according to the abnormality; and
a storing unit that stores the image read by the reading unit, wherein when the detecting unit detects the abnormality while the reading unit is reading the image, the controlling unit stops the image from being transferred into the storing unit."

Please insert the following:

-- 1. An image processing apparatus comprising:
a controlling unit that controls all units of the image forming apparatus;
a reading unit that reads an image;
a processing unit that generates image data based on the image read by the reading unit;
a forming unit that forms an output image based on the image data generated by the processing unit,
a recognizing unit that recognizes a ground tint pattern in the image read by the reading unit;
a detecting unit that detects an abnormality in the recognizing unit,
wherein when the detecting unit detects the abnormality while the reading unit is reading the image, the controlling unit stops the forming unit from forming the output image when the recognizing unit recognizes a ground tint pattern in an image read by the reading unit, the controlling unit controls the processing unit to perform a special processing on the image, and
when the detecting unit detects an abnormality in the recognizing unit, the controlling unit controls the image forming apparatus according to the abnormality,
wherein when the detecting unit detects the abnormality while the reading unit is reading the image, the controlling unit stops the forming unit from forming the output image.

2. The image processing apparatus according to claim 1,
wherein the abnormality is when a setting of a parameter necessary for the recognizing unit to recognize a ground tint pattern does not complete normally.

3. The image processing apparatus according to claim 1,
wherein the abnormality is when the recognizing unit does not generate a signal level that is normally output.

4. The image processing apparatus according to claim 1,
wherein when the detecting unit detects the abnormality before the reading unit starts to read the image, the controlling unit stops the reading unit from starting to read the image.

5. An image processing apparatus comprising:
a controlling unit that controls all units of the image forming apparatus;
a reading unit that reads an image;
a processing unit that generates image data based on the image read by the reading unit;
a recognizing unit that recognizes a ground tint pattern in the image read by the reading unit;
a detecting unit that detects an abnormality in the recognizing unit,
when the recognizing unit recognizes a ground tint pattern in an image read by the reading unit, the controlling unit controls the processing unit to perform a special processing on the image, and
when the detecting unit detects an abnormality in the recognizing unit, the controlling unit controls the image forming apparatus according to the abnormality, and when the detecting unit detects the abnormality while the reading unit is reading the image, the controlling unit stops the reading unit from continuing to read the image, when the detecting unit detects the abnormality before the reading unit starts to read the image, the controlling unit performs a system abnormality process.

6. The image processing apparatus according to claim 1, wherein
when the detecting unit detects the abnormality while the reading unit is reading the image, the controlling unit performs a system abnormality process.

7. The image processing apparatus according to claim 1, wherein
when the detecting unit detects the abnormality, the controlling unit performs a system abnormality process. --

(12) United States Patent
Toyonori et al.

(10) Patent No.: US 7,518,742 B2
(45) Date of Patent: Apr. 14, 2009

(54) IMAGE PROCESSING APPARATUS WITH GROUND-TINT PATTERN RECOGNITION AND ABNORMALITY DETECTION

(75) Inventors: Shiho Toyonori, Tokyo (JP); Tsuyoshi Endoh, Kanagawa (JP); Takeshi Kowada, Saitama (JP); Nobuaki Tomidokoro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 599 days.

(21) Appl. No.: 11/280,256

(22) Filed: Nov. 17, 2005

(65) Prior Publication Data
US 2006/0126097 A1    Jun. 15, 2006

(30) Foreign Application Priority Data
Nov. 26, 2004 (JP) ............................. 2004-341473

(51) Int. Cl.
*H04N 1/40* (2006.01)
*H04N 1/44* (2006.01)
*G06K 9/78* (2006.01)
*G06K 15/02* (2006.01)

(52) U.S. Cl. ................................. 358/1.14; 382/135

(58) Field of Classification Search ................ 358/1.9, 358/2.1, 3.24, 3.28, 1.14, 1.6, 501, 530, 401, 358/448, 468, 437; 382/100, 135, 137, 181, 382/217, 218; 399/366; 340/5.86; 356/71; 283/901, 902
See application file for complete search history.

(56) References Cited

U.S. PATENT DOCUMENTS

| | | | |
|---|---|---|---|
| 5,418,602 A * | 5/1995 | Nishikawa | 399/366 |
| 5,440,409 A * | 8/1995 | Sugano et al. | 358/501 |
| 5,444,518 A * | 8/1995 | Hashiguchi et al. | 358/501 |
| 5,640,467 A * | 6/1997 | Yamashita et al. | 382/181 |
| 5,722,029 A | 2/1998 | Tomidokoro et al. | |
| 5,781,653 A * | 7/1998 | Okubo | 382/135 |
| 5,987,227 A | 11/1999 | Endo et al. | |
| 6,226,102 B1 | 5/2001 | Koike et al. | |
| 6,597,470 B1 | 7/2003 | Tomidokoro | |
| 6,832,010 B2 | 12/2004 | Miyazaki et al. | |
| 6,833,928 B2 | 12/2004 | Tomidokoro | |
| 7,131,775 B2 * | 11/2006 | Uchida et al. | 400/62 |
| 7,168,868 B2 * | 1/2007 | Uchida et al. | 358/3.28 |
| 2004/0252347 A1 * | 12/2004 | Hosoya et al. | 358/3.28 |
| 2005/0088701 A1 * | 4/2005 | Uchida et al. | 358/3.28 |

(Continued)

FOREIGN PATENT DOCUMENTS

JP    4-302374    10/1992

(Continued)

*Primary Examiner*—Scott A Rogers
(74) *Attorney, Agent, or Firm*—Oblon, Spivak, McClelland, Maier & Neustadt, P.C.

(57) ABSTRACT

An image processing apparatus includes a controlling unit that controls all units of the image forming apparatus, a reading unit that reads an image, a processing unit that generates image data based on the image read, a recognizing unit that recognizes a ground tint pattern in the image read, and a detecting unit that detects an abnormality in the recognizing unit. When the recognizing unit recognizes a ground tint pattern in an image read, the controlling unit controls the processing unit to perform a special processing on the image. When the detecting unit detects an abnormality in the recognizing unit, the controlling unit controls the image forming apparatus according to the abnormality.

7 Claims, 7 Drawing Sheets